(12) United States Patent
Rozas et al.

(10) Patent No.: US 7,873,793 B1
(45) Date of Patent: Jan. 18, 2011

(54) SUPPORTING SPECULATIVE MODIFICATION IN A DATA CACHE

(76) Inventors: Guillermo Rozas, 104 Magneson Ter., Los Gatos, CA (US) 95032; Alexander Klaiber, 231 Sierra Vista Ave., Mtn. View, CA (US) 94043; David Dunn, 4525 191st Pl., NE., Sammamish, WA (US) 98074; Paul Serris, 661 San Diego Ave., Sunnyvale, CA (US) 94085; Lacky Shah, 1228 Sunrise Dr., Fremont, CA (US) 94539

( * ) Notice: Subject to any disclaimer, the term of this patent is extended or adjusted under 35 U.S.C. 154(b) by 0 days.

(21) Appl. No.: 11/807,629

(22) Filed: May 29, 2007

Related U.S. Application Data

(63) Continuation of application No. 10/622,028, filed on Jul. 16, 2003, now Pat. No. 7,225,299.

(51) Int. Cl.
*G06F 12/08* (2006.01)

(52) U.S. Cl. .......................... 711/144; 711/137

(58) Field of Classification Search ........................ None
See application file for complete search history.

(56) References Cited

U.S. PATENT DOCUMENTS

| | | | |
|---|---|---|---|
| 5,155,831 A | 10/1992 | Emma et al. | |
| 5,428,761 A | 6/1995 | Herlihy et al. | |
| 5,548,735 A | 8/1996 | Chen et al. | |
| 5,634,073 A | 5/1997 | Collins et al. | |
| 5,701,432 A | 12/1997 | Wong et al. | |
| 5,802,574 A | 9/1998 | Atallah et al. | |
| 5,838,934 A | 11/1998 | Ramagopal et al. | |
| 5,838,943 A | 11/1998 | Ramagopal et al. | |
| 5,926,645 A | 7/1999 | Williamson | |
| 5,930,821 A | 7/1999 | Gaskins et al. | |
| 5,974,438 A | 10/1999 | Neufeld | |
| 6,006,299 A | 12/1999 | Wang et al. | |
| 6,006,317 A | 12/1999 | Ramagopal et al. | |
| 6,119,205 A | 9/2000 | Wicki et al. | |
| 6,134,651 A | 10/2000 | Witt et al. | |
| 6,189,074 B1 | 2/2001 | Pedneau | |
| 6,263,407 B1 | 7/2001 | Arimilli et al. | |
| 6,304,944 B1 | 10/2001 | Pedneau | |
| 6,460,130 B1 | 10/2002 | Trull et al. | |
| 6,487,639 B1 * | 11/2002 | Lipasti | 711/137 |
| 6,526,480 B1 | 2/2003 | Naruse et al. | |
| 6,564,301 B1 | 5/2003 | Middleton | |
| 6,625,694 B2 | 9/2003 | Masri et al. | |

(Continued)

OTHER PUBLICATIONS

Handy, Jim, "The Cache Memory Book", 1998, pp. 66, 77-86.

*Primary Examiner*—Denise Tran

(57) ABSTRACT

Method and system for supporting speculative modification in a data cache are provided and described. A data cache comprises a plurality of cache lines. Each cache line includes a state indicator for indicating anyone of a plurality of states, wherein the plurality of states includes a speculative state to enable keeping track of speculative modification to data in the respective cache line. The speculative state enables a speculative modification to the data in the respective cache line to be made permanent in response to a first operation performed upon reaching a particular instruction boundary during speculative execution of instructions. Further, the speculative state enables the speculative modification to the data in the respective cache line to be undone in response to a second operation performed upon failing to reach the particular instruction boundary during speculative execution of instructions.

37 Claims, 5 Drawing Sheets

U.S. PATENT DOCUMENTS

| | | |
|---|---|---|
| 6,658,536 B1 | 12/2003 | Arimilli et al. |
| 6,725,337 B1 | 4/2004 | Tan et al. |
| 6,738,864 B2 | 5/2004 | Chauvel |
| 6,775,749 B1 | 8/2004 | Mudgett et al. |
| 6,779,085 B2 | 8/2004 | Chauvel |
| 6,839,813 B2 | 1/2005 | Chauvel |
| 6,877,088 B2 | 4/2005 | Dice |
| 6,938,130 B2 | 8/2005 | Jacobson et al. |
| 6,976,110 B2 | 12/2005 | Moyer et al. |
| 7,225,299 B1 * | 5/2007 | Rozas et al. ............ 711/137 |
| 2003/0014602 A1 | 1/2003 | Shibayama et al. |

* cited by examiner

SUPPORTING SPECULATIVE MODIFICATION IN A DATA CACHE

RELATED APPLICATIONS

The present application is a continuation application of and claims the benefit of U.S. patent application Ser. No. 10/622,028, filed Jul. 16, 2003, now U.S. Pat. No. 7,225,299, entitled "SUPPORTING SPECULATIVE MODIFICATION IN A DATA CACHE," naming Bill Rozas, Alexander Klaiber, David Dunn, Paul Serris, and Lacky Shah as inventors, assigned to the assignee of the present invention. That application is incorporated herein by reference in its entirety and for all purposes.

BACKGROUND OF THE INVENTION

1. Field of the Invention

The present invention generally relates to data caches. More particularly, the present invention relates to the field of supporting speculative modification in a data cache.

2. Related Art

A data cache interacts with a processor to increase system performance. However, if the processor is speculatively executing instructions, a traditional data cache is unable to properly deal with speculative modifications.

SUMMARY OF THE INVENTION

Method and system for supporting speculative modification in a data cache are provided and described.

BRIEF DESCRIPTION OF THE DRAWINGS

The accompanying drawings, which are incorporated in and form a part of this specification, illustrate embodiments of the invention and, together with the description, serve to explain the principles of the present invention.

DETAILED DESCRIPTION OF THE INVENTION

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details.

Figure 1:
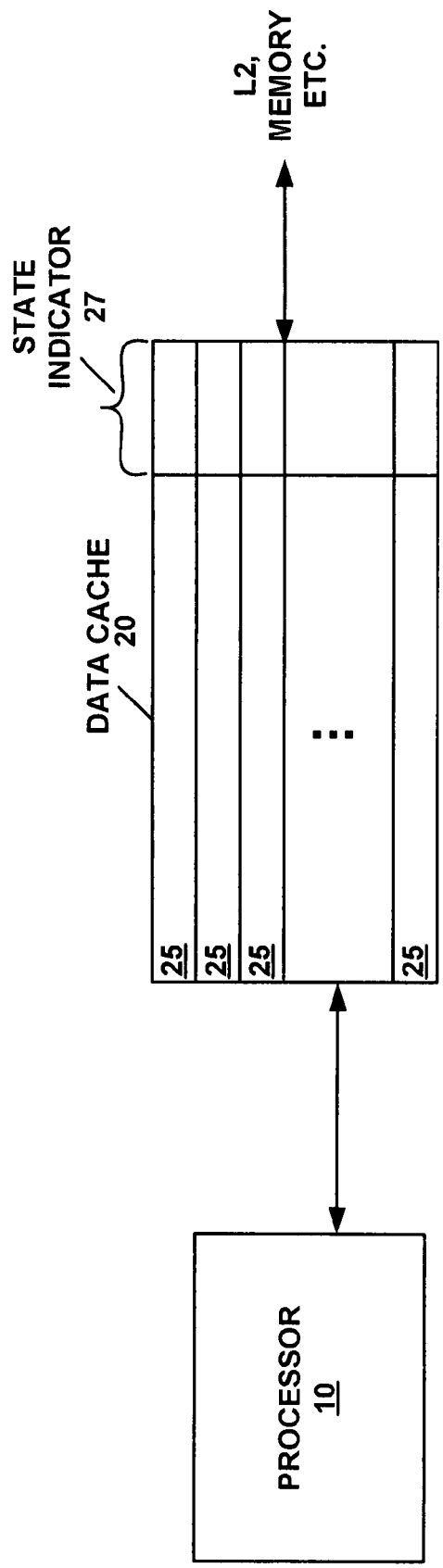
FIG. 1 illustrates a system in accordance with a first embodiment of the present invention.

FIG. 1 illustrates a system 100 in accordance with a first embodiment of the present invention. As illustrated in FIG. 1, the system 100 includes a processor 10 and a data cache 20.

The processor 10 is able to speculatively execute instructions. If the processor 10 speculatively executes instructions to a particular instruction boundary without generating errors, the speculative store operations to the data cache 20 can be made permanent with a commit operation. However, if errors occur before reaching the particular instruction boundary, the speculative store operations to the data cache 20 have to be undone with a rollback operation.

The data cache 20 includes a plurality of cache lines 25. Each cache line includes a state indicator 27 for indicating anyone of a plurality of states. The plurality of states include an invalid state, a valid state, a dirty state, and a speculative state. The invalid state indicates that the respective cache line is not being used. The valid state indicates that the respective cache line has clean data. The dirty state indicates that the respective cache line has dirty data (or the most recent data compared to other memory components such as L2 data cache, main memory, etc.). The speculative state enables keeping track of speculative modification to data in said respective cache line. The speculative state enables a speculative modification to the data in the respective cache line to be made permanent in response to a commit operation.

Moreover, the speculative state enables the speculative modification to the data in the respective cache line to be undone in response to a rollback operation. Cache lines having the speculative state cannot be drained to other memory components such as L2 data cache, main memory, etc.

Figure 2:
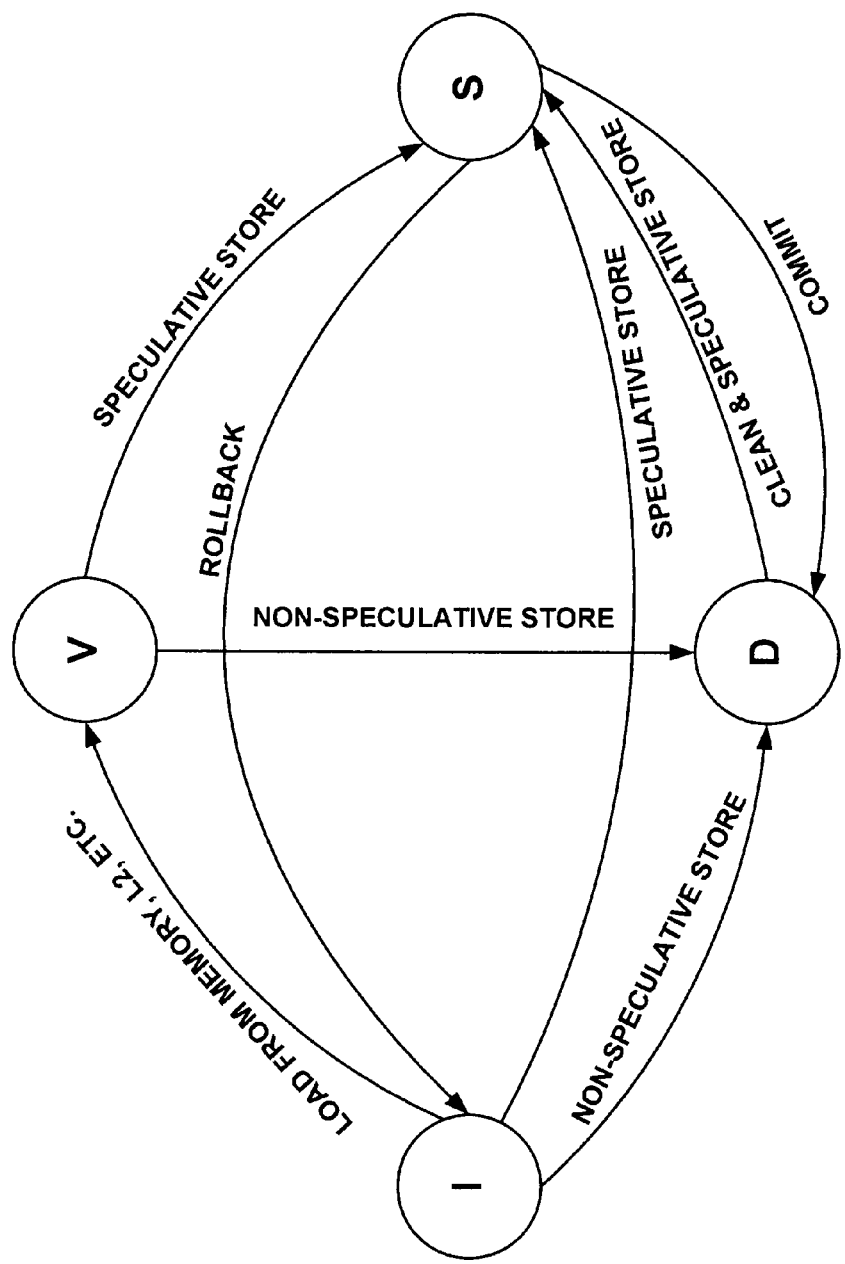
FIG. 2 illustrates a state diagram of a data cache in accordance with a first embodiment of the present invention.

FIG. 2 illustrates a state diagram of a data cache in accordance with a first embodiment of the present invention. As described above, a cache line can have an invalid state I, a valid state V, a dirty state D, or a speculative state S. (For clarity, state transitions from V, D, and S states to the I state, corresponding to the traditional operation of the data cache 20 evicting a cache line 25, have been omitted in FIG. 2)

Invalid State I

Assuming the cache line is in the invalid state I, there are several possibilities for this cache line. If a non-speculative store is performed by the processor 10 (FIG. 1), the cache line moves to the dirty state D. If data is loaded from memory components such as L2 data cache, main memory, etc., the cache line moves to the valid state V, where the data is clean (has same version as the memory components such as L2 data cache, main memory, etc.). If a speculative store is performed by the processor 10 (FIG. 1), the cache line moves to the speculative state S.

Valid State V

Assuming the cache line is in the valid state V, there are several possibilities for this cache line. If a non-speculative store is performed by the processor 10 (FIG. 1), the cache line moves to the dirty state D. If a speculative store is performed by the processor 10 (FIG. 1), the cache line moves to the speculative state S.

Dirty State D

Assuming the cache line is in the dirty state D, there are several possibilities for this cache line. If a speculative store is performed by the processor 10 (FIG. 1) to this cache line, the cache line is first written back to a memory component such as L2 data cache, main memory, etc., thus preserving the cache line data as of before the speculative modification. Then, the speculative store is performed, moving the cache line to the speculative state S.

Speculative State S

Assuming the cache line is in the speculative state S, there are several possibilities for this cache line. If a commit operation is performed, the cache line moves to the dirty state D. If a rollback operation is performed, the cache line moves to the invalid state I.

Figure 3:
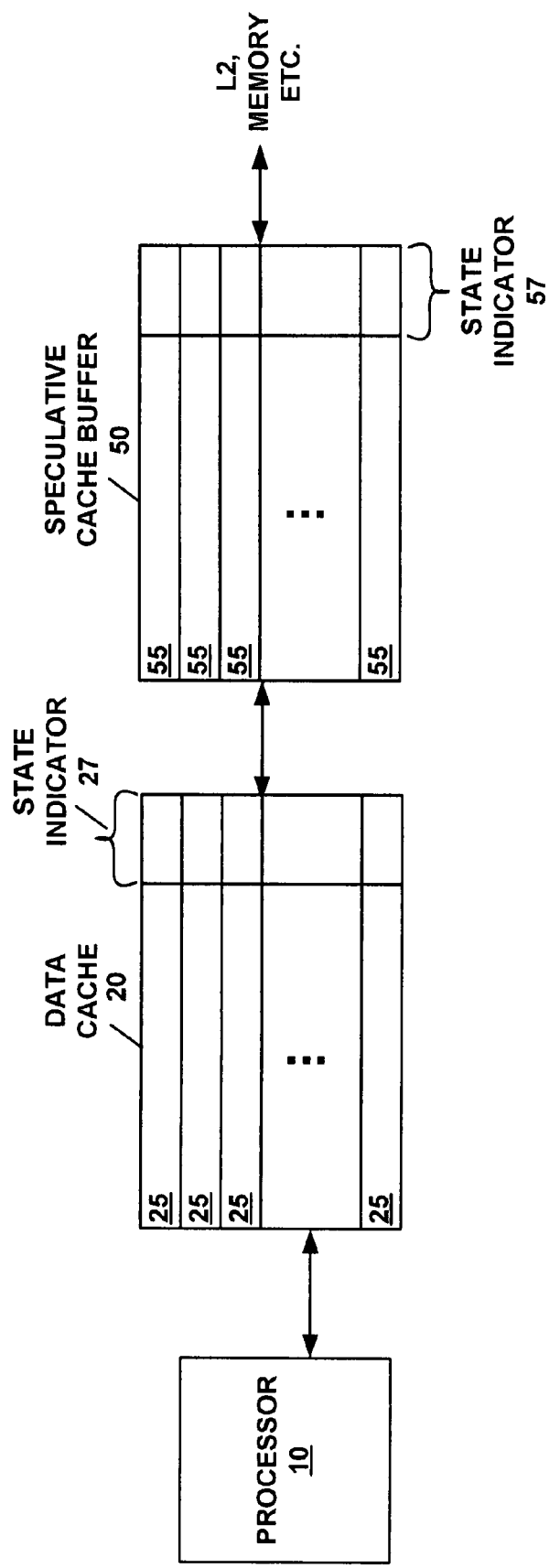
FIG. 3 illustrates a system in accordance with a second embodiment of the present invention.

FIG. 3 illustrates a system 300 in accordance with a second embodiment of the present invention. The system 300 includes a processor 10, a data cache 20, and a speculative cache buffer 50. The discussion with respect to the processor 10 and the data cache 20 is equally applicable to FIG. 3.

The speculative cache buffer 50 receives cache lines which have the speculative state S or the dirty state D and are evicted or drained from the data cache 20. Hence, the data cache 20 can send cache lines having the speculative state S or the dirty state D to the speculative cache buffer 50 and retrieve them when necessary.

Moreover, the speculative cache buffer 50 has a plurality of cache lines 55. Each cache line 55 includes a state indicator 57 for indicating anyone of a plurality of states. The plurality of states includes an invalid state, a dirty state, and a speculative state. In one embodiment, the speculative cache buffer 50 is fully associative.

The data cache 20 can drain cache lines that are in the dirty state D or the speculative state S to the speculative cache buffer 50. Moreover, the speculative cache buffer 50 can drain cache lines that are in the dirty state D to a memory component such as L2 data cache, main memory, etc.

Figure 4:
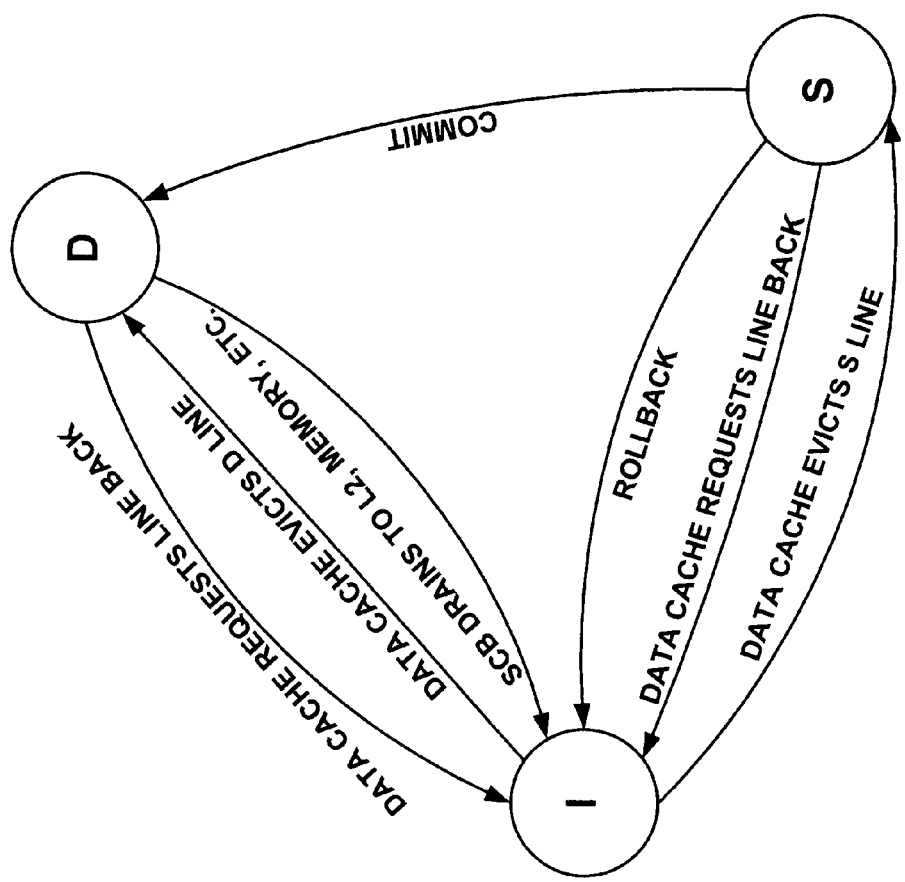
FIG. 4 illustrates a first state diagram of a speculative cache buffer in accordance with a second embodiment of the present invention.

FIG. 4 illustrates a first state diagram of a speculative cache buffer in accordance with a second embodiment of the present invention. As described above, a cache line can have an invalid state I, a dirty state D, or a speculative state S.

Invalid State I

Assuming the cache line is in the invalid state I, there are several possibilities for this cache line. If the data cache 20 evicts a cache line having the dirty state D, the cache line moves to the dirty state D. If the data cache 20 evicts a cache line having the speculative state S, the cache line moves to the speculative state S.

Dirty State D

Assuming the cache line is in the dirty state D, there are several possibilities for this cache line. If the speculative cache buffer 50 drains the cache line having the dirty state D to a memory component such as L2 data cache, main memory, etc., the cache line moves to the invalid state I. In case the data cache 20 requests the cache line back, the cache line moves to the invalid state I in the speculative cache buffer 50.

Speculative State S

Assuming the cache line is in the speculative state S, there are several possibilities for this cache line. If a commit operation is performed, the cache line moves to the dirty state D. If a rollback operation is performed, the cache line moves to the invalid state I. In case the data cache 20 requests the cache line back, the cache line moves to the invalid state I in the speculative cache buffer 50.

It is possible that multiple versions of a cache line in the dirty state may exist in the speculative cache buffer 50. For instance, the data cache 20 may drain the cache line having the dirty state to the speculative cache buffer 50 because a speculative store has to be performed to the cache line in the data cache 20. If the cache line having the speculative state is later drained to the speculative cache buffer 50 and if a commit operation is performed, then the speculative cache buffer 50 would have two cache lines with different versions of the data, whereas only one version of the data needs to be drained to a memory component such as L2 data cache, main memory, etc.

In an alternate embodiment of the speculative cache buffer 50, the plurality of states also includes a commit-kill state, in addition to the invalid state, the dirty state, and the speculative state. The commit-kill state indicates that the data cache 20 has evicted the respective cache line having the dirty state in response to a speculative modification operation (or speculative store) to the respective cache line in the data cache 20. The commit-kill state reduces the number of copies of a cache line in the dirty state and saves bandwidth in case of the commit operation, as detailed below.

Figure 5:
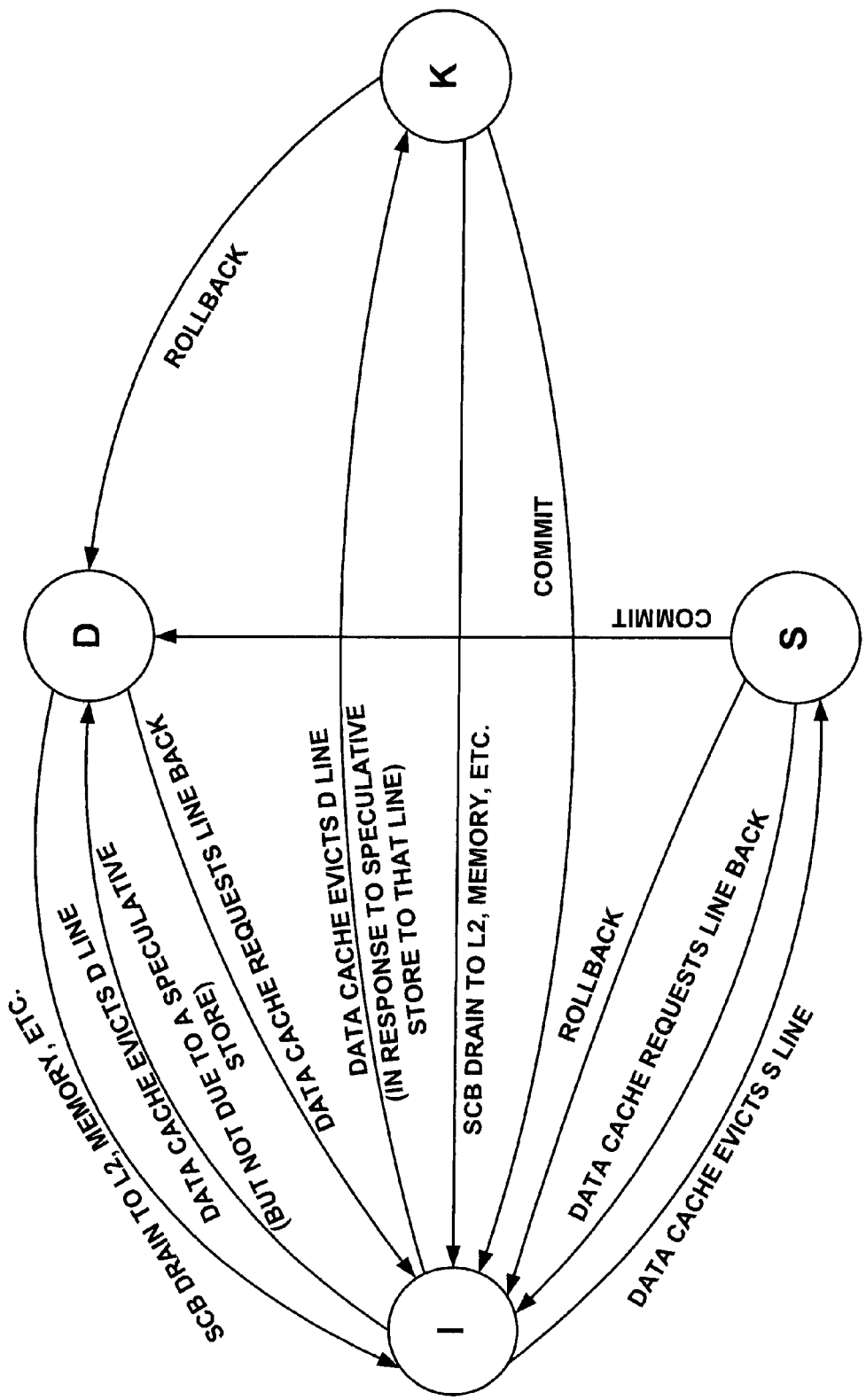
FIG. 5 illustrates a second state diagram of a speculative cache buffer in accordance with a second embodiment of the present invention.

FIG. 5 illustrates a second state diagram of a speculative cache buffer in accordance with a second embodiment of the present invention. As described above, a cache line can have an invalid state I, a dirty state D, a commit-kill state K, or a speculative state S.

Invalid State I

Assuming the cache line is in the invalid state I, there are several possibilities for this cache line. If the data cache 20 evicts a cache line having the dirty state D but not due to a speculative store operation, the cache line moves to the dirty state D. If the data cache 20 evicts a cache line having the speculative state S, the cache line moves to the speculative state S. If the data cache 20 evicts a cache line having the dirty state D in response to a speculative store operation to that cache line, the cache line moves to the commit-kill state K.

Dirty State D

Assuming the cache line is in the dirty state D, there are several possibilities for this cache line. If the speculative cache buffer 50 drains the cache line having the dirty state D to a memory component such as L2 data cache, main memory, etc., the cache line moves to the invalid state I. In case the data cache 20 requests the cache line back, the cache line moves to the invalid state I in the speculative cache buffer 50.

Speculative State S

Assuming the cache line is in the speculative state S, there are several possibilities for this cache line. If a commit operation is performed, the cache line moves to the dirty state D. If a rollback operation is performed, the cache line moves to the invalid state I. In case the data cache 20 requests the cache line back, the cache line moves to the invalid state I in the speculative cache buffer 50.

Commit-kill State K

Assuming the cache line is in the commit-kill state K, there are several possibilities for this cache line. If a commit operation is performed, the cache line moves to the invalid state I. If a rollback operation is performed, the cache line moves to the dirty state D. If the speculative cache buffer 50 drains the cache line having the commit-kill state K to a memory component such as L2 data cache, main memory, etc., the cache line moves to the invalid state I.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A data cache comprising:
a plurality of cache lines, wherein a first cache line of the plurality of cache lines includes a state indicator for indicating at least one of a plurality of states, wherein the plurality of states includes a speculative state configured to track a speculative modification to data in the first cache line, and wherein the speculative state enables the speculative modification to the data in the first cache line to be undone in response to an operation performed responsive to not reaching an instruction boundary during speculative execution of instructions; and wherein said data cache is controllable to evict a particular cache line of said plurality of cache lines to a speculative cache buffer, and wherein said speculative cache buffer comprises at least one state indicator corresponding to at least one cache line of said speculative cache buffer.

2. The data cache of claim 1, wherein the plurality of states further includes an invalid state, a dirty state, and a valid state.

3. The data cache of claim 1, wherein the speculative state enables the speculative modification to the data in the first cache line to be made permanent in response to a second operation, wherein the second operation is a commit operation.

4. The data cache of claim 1, wherein the operation is a rollback operation.

5. The data cache of claim 1, wherein the first cache line is cleaned, before the speculative modification to the data in the first cache line, by writing back dirty data of the first cache line to a second memory component.

6. A system comprising:
a data cache including a plurality of cache lines, wherein a first cache line of the plurality of cache lines includes a state indicator for indicating at least one of a plurality of states, wherein the plurality of states includes a speculative state configured to track a speculative modification to data in the first cache line, and wherein the speculative state enables the speculative modification to the data in the first cache line to be undone in response to an operation performed responsive to not reaching an instruction boundary during speculative execution of instructions; and
a speculative cache buffer controllable to receive cache lines evicted from said data cache, and wherein said speculative cache buffer comprises at least one state indicator corresponding to at least one cache line of said speculative cache buffer.

7. The system of claim 6, wherein the plurality of states further includes an invalid state, a dirty state, and a valid state, and wherein the second plurality of states includes the speculative state and the dirty state.

8. The system of claim 6, wherein the speculative state enables the speculative modification to the data in the first cache line to be made permanent in response to a second operation, and wherein the second operation is a commit operation.

9. The system of claim 6, wherein the operation is a rollback operation.

10. The system of claim 6, wherein the first cache line is evicted to the speculative cache buffer before the speculative modification to the data in the first cache line.

11. The system of claim 6, wherein the second plurality of states includes a commit-kill state.

12. The system of claim 6, wherein the speculative cache buffer is fully associative.

13. A system comprising:
a data cache including a plurality of cache lines, wherein a first cache line of the plurality of cache lines includes a state indicator for indicating at least one of a plurality of states, wherein the plurality of states includes a speculative state configured to track a speculative modification to data in the first cache line, wherein the speculative state enables the speculative modification to the data in the first cache line to be undone in response to an operation performed responsive to not reaching an instruction boundary during speculative execution of instructions, wherein said data cache is controllable to evict a particular cache line of said plurality of cache lines to a speculative cache buffer, and wherein said speculative cache buffer comprises at least one state indicator corresponding to at least one cache line of said speculative cache buffer; and
a processor configured to perform a speculative store operation to the data cache.

14. The system of claim 13, wherein the speculative state enables the speculative modification to the data in the first cache line to be made permanent in response to a second operation, and wherein the second operation is a commit operation.

15. The system of claim 13, wherein the operation is a rollback operation.

16. The system of claim 13, wherein the first cache line is cleaned, before the speculative modification to the data in the first cache line, by writing back dirty data of the first cache line to a second memory component.

17. The system of claim 13 further comprising said speculative cache buffer configured to receive evicted cache lines, wherein the evicted cache lines are evicted from the data cache and are associated with one of a second plurality of states.

18. The system of claim 17, wherein the plurality of states further includes an invalid state, a dirty state, and a valid state, and wherein the second plurality of states includes the speculative state and said dirty state.

19. The system of claim 17, wherein the first cache line is evicted to the speculative cache buffer before the speculative modification to the data in the first cache line.

20. The system of claim 17, wherein the second plurality of states includes a commit-kill state.

21. The system of claim 17, wherein the speculative cache buffer is fully associative.

22. A method comprising:
in response to a speculative modification to data in a cache line, setting a state indicator of said cache line to a speculative state;
if the speculative modification to the data is requested to be undone, changing the state indicator of the cache line to a first state in response to an operation performed responsive to not reaching an instruction boundary during speculative execution of instructions; and
evicting said cache line to a speculative cache buffer, wherein said speculative cache buffer comprises at least one state indicator corresponding to at least one cache line of said speculative cache buffer.

23. The method of claim 22 further comprising: if the speculative modification to the data is requested to be made permanent, changing the state indicator to a second state in response to a second operation.

24. The method of claim 23, wherein the first state is an invalid state, and wherein said second state is a dirty state.

25. The method of claim 23, wherein the second operation is a commit operation.

26. The method of claim 22, wherein the operation is a rollback operation.

27. The method of claim 22 further comprising:
cleaning the cache line, before the speculative modification to the data in the first cache line, by writing back to memory dirty data of the cache line.

28. A method comprising:
    receiving at a speculative cache buffer a cache line which is evicted from a data cache, wherein data of the cache line includes a speculative modification;
    setting a state indicator of the cache line to a speculative state in the speculative cache buffer; and
    if the speculative modification to the data is requested to be undone, changing the state indicator of the cache line to a first state in the speculative cache buffer in response to an operation performed responsive to not reaching an instruction boundary during speculative execution of instructions.

29. The method of claim 28 further comprising:
    if the speculative modification to the data is requested to be made permanent, changing the state indicator to a second state in response to a second operation.

30. The method of claim 29, wherein the first state is an invalid state, and wherein said second state is a dirty state.

31. The method of claim 29, wherein the second operation is a commit operation.

32. The method of claim 28, wherein the operation is a rollback operation.

33. A method of comprising:
    in response to a speculative modification of data in a cache line within a data cache, receiving at a speculative cache buffer the cache line which is evicted from the data cache;
    setting a state indicator of the cache line to a commit-kill state in the speculative cache buffer; and
    if the speculative modification to the data is requested to be undone, changing the state indicator of the cache line to a first state in the speculative cache buffer in response to an operation performed responsive to not reaching an instruction boundary during speculative execution of instructions.

34. The method of claim 33 further comprising:
    if the speculative modification to the data is requested to be made permanent, changing the state indicator to a second state in response to a second operation.

35. The method of claim 34, wherein the first state is a dirty state, and wherein the second state is an invalid state.

36. The method of claim 34, wherein the second operation is a commit operation.

37. The method of claim 33, wherein the operation is a rollback operation.

* * * * *

UNITED STATES PATENT AND TRADEMARK OFFICE
CERTIFICATE OF CORRECTION

| | | |
|---|---|---|
| PATENT NO. | : 7,873,793 B1 | Page 1 of 1 |
| APPLICATION NO. | : 11/807629 | |
| DATED | : January 18, 2011 | |
| INVENTOR(S) | : Rozas et al. | |

It is certified that error appears in the above-identified patent and that said Letters Patent is hereby corrected as shown below:

Title page, item (76), under "Inventors", in Column 1, Line 7, delete "Sunnyavle," and insert -- Sunnyvale, --.

Column 8, line 1, in Claim 33, after "method" delete "of".

Signed and Sealed this
Twenty-first Day of June, 2011

David J. Kappos
*Director of the United States Patent and Trademark Office*